United States Statutory Invention Registration [19]

[11] Reg. Number: H324

Rubin

[43] Published: Sep. 1, 1987

[54] FENCE FOR REDUCING TURBULENCE

[75] Inventor: Donald V. Rubin, Huntsville, Ala.

[73] Assignee: The United States of America as represented by the Secretary of the Army, Washington, D.C.

[21] Appl. No.: 23,492

[22] Filed: Feb. 27, 1987

[51] Int. Cl.[4] ..... B64C 1/00; B64C 30/00

[52] U.S. Cl. ..... 244/117 R; 244/129.1; 244/129.3

*Primary Examiner*—Charles T. Jordan

*Attorney, Agent, or Firm*—Freddie M. Bush; Robert L. Broad, Jr.

[57] ABSTRACT

A system for lowering the level of turbulence in an opening over which a stream of air is flowing at a subsonic velocity wherein a fence positioned adjacent to the opening at an upstream location is provided with a plurality of apertures in the distal portion thereof. The apertures in the distal portion of the fence spread the shear layer of air flowing over the top edge of the fence and substantially reduce turbulence within the opening.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FENCE FOR REDUCING TURBULENCE

DEDICATORY CLAUSE

The invention described herein may be manufactured, used, and licensed by or for the Government for governmental purposes without the payment to me of any royalties thereon.

BACKGROUND OF THE INVENTION

Field of the invention

This invention relates to apparatus for lowering the level of turbulence in a cavity over which air is flowing.

Prior art

It is sometimes desirable to precisely determine, from a moving aircraft, the precise direction of an object or a source of light. Inasmuch as it is not practical to mount imaging equipment on the outside of the hull of an aircraft, this equipment is mounted inside the aircraft adjacent to a window or opening through which the light from the source passes. To obtain the most precise detection of the direction of the light source and the sharpest focus of the image of the light source, a window must be free of any glass or other cover. The reason for this is that it is not at present possible to manufacture a transparent closure for the opening which will not shift the apparent direction of the light source, and in addition, defocus the image of the light source. Thus, an open hole in the wall of the aircraft must be used.

The use of the open hole in the wall of the aircraft creates another problem. Air flowing over the hole or cavity at subsonic velocities creates a very high turbulence in the cavity or hole in the wall of the aircraft. This causes the image of the light to jump from place to place on that element of the sensing unit on which the light falls. When this happens an accurate sensing of the true direction of the light source cannot be carried out. Further, the turbulence in the hole in the aircraft wall will scatter the light rays from the source so that a sharp image of the source cannot be obtained. This, too, will result in an inaccurate determination of the true direction of the light source.

Further, the turbulence buffets equipment, such as sensors etc., mounted in the aircraft near the hole. Vibration of this equipment, caused by turbulence, will make it impossible to accurately sense the true direction of the object being observed.

It is known to use a fence to lower turbulence in an opening in a wall along which a stream of air is flowing. The fence, which is usually raked, is secured to the wall adjacent to the upstream edge of the hole. Imperforate fences lower turbulence in the opening but, to be effective, must protrude an undesirable distance into the air stream. It is also known to use a fence which is provided with apertures across the entire area of the fence. This apertured fence is superior to the imperforate fence but is still not entirely satisfactory.

SUMMARY OF THE INVENTION

A system for lowering the level of turbulence in an opening through a wall over which air is flowing at a subsonic velocity, wherein a fence secured to the wall adjacent to the leading edge of the opening extends outwardly into the air stream and has a distal portion thereof provided with apertures to spread the shear layer formed by air flowing over the edge of the fence. The apertures in the fence are only in the distal portion of the fence, with the remainder of the fence being imperforate.

DESCRIPTION OF THE PREFERRED EMBODIMENT

Figure 1:
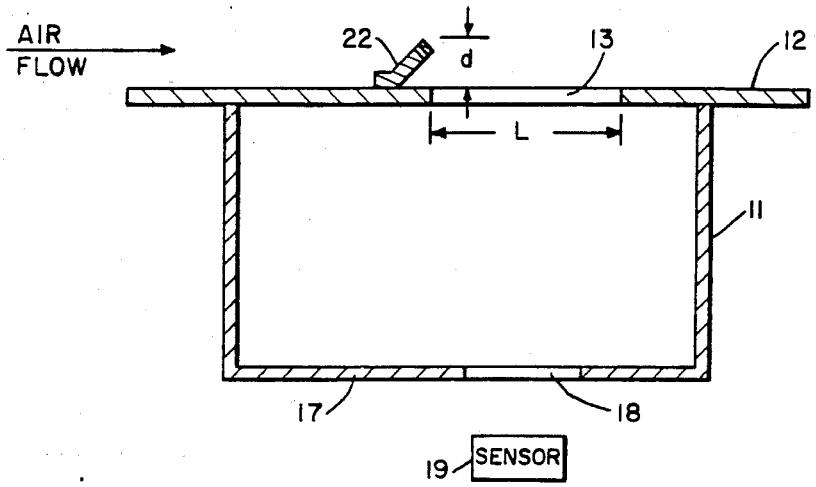
FIG. 1 is a cross sectional view of an enclosure with an opening simulating an opening in the wall of an aircraft.

Referring now in detail to the drawing, there is shown an enclosure 11 with a top 12 having an opening 13 therein, the opening having a length, L. A bottom 17 of the enclosure 11 is provided with an optical window 18 through which light rays from a source (not shown) can pass to a sensor 19 of a known type. The enclosure 11 with its opening 13 simulates an aircraft hull with an opening therein when a stream of air is directed of subsonic velocity across the top of the enclosure 11 in the direction shown.

Figure 2:
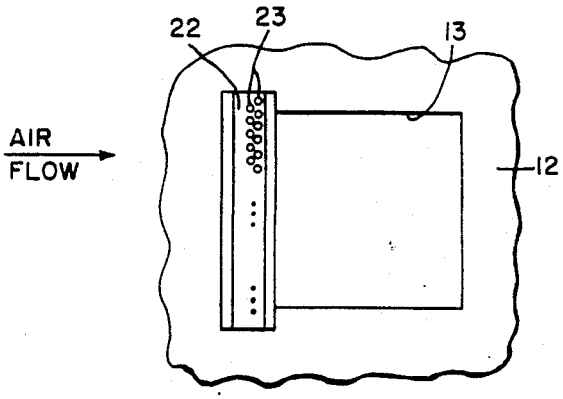
FIG. 2 is a plan view of a portion of the top of the enclosure of FIG. 1 showing the positioning of the fence relative to the opening in the enclosure.

A fence 22 secured to the top 12 adjacent to the leading edge of the opening 13 and extending thereacross serves to reduce turbulence in the opening 13 and the enclosure 11. The fence 22 is provided with a plurality of apertures 23 in the distal portion thereof as best shown in FIG. 2, with the remainder of the fence being imperforate. The area of the fence 22 which has the apertures 23 is about 35 to 65 percent of the total area of the fence 22, extending from the distal edge of the fence 22 toward its point of attachment to the top 12. The apertures 23 which occupy up to about 50 percent of the area in which the apertures occur, serve to break up or scatter the shear zone of air flowing at high velocity across the distal edge of the fence. Preferably, about 40 percent of the distal portion of the fence is in the form of the apertures 23.

Figure 3:
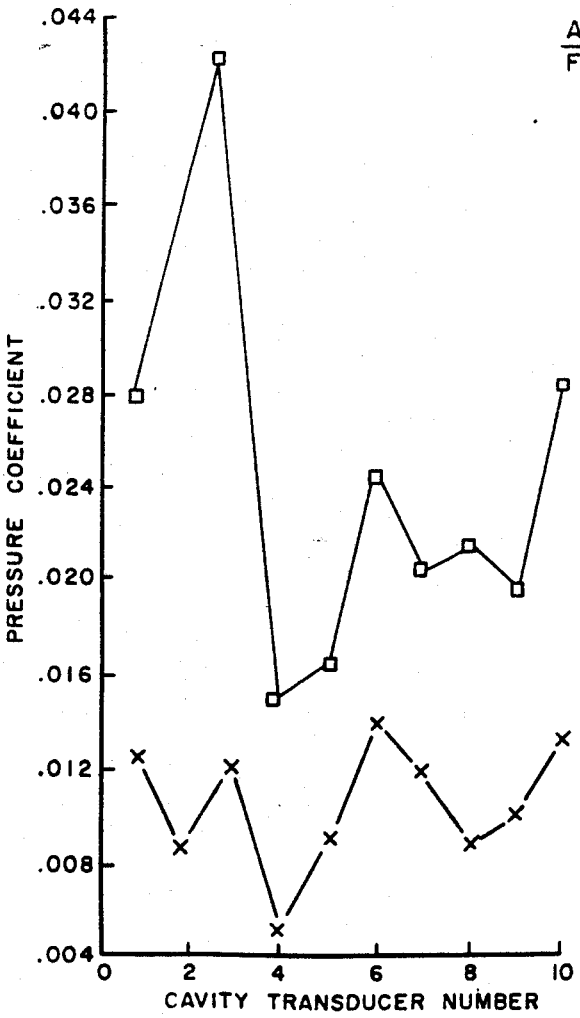
FIG. 3 is a chart showing a comparison of the result which is achieved by a fully apertured prior art fence and the fence of this invention where the apertures are only in the distal portion of the fence.

FIG. 3 is a chart showing a comparison of results achieved by a conventional fence and the fence of this invention, with the upper curve showing the results achieved by the conventional fence and the lower curve the results achieved by the fence of this invention. Both fences extended a distance, d, of one inch from the top 12 and were positioned at an angle of 30° with respect to the top 12. The conventional fence was provided with apertures 23 across the entire surface of the fence, with these apertures making up 40% of the area of the fence. In the fence of this invention, the apertures 23 were only in the distal portion, as best illustrated in FIG. 2, and amounted to 40% of the area of the distal portion of the fence.

To obtain the results shown in FIG. 3, transducers of a known type were positioned at various locations inside the enclosure 11 and a stream of air was passed across the top 12 of the enclosure 11 in the direction shown in FIG. 1 at a subsonic velocity. It can readily be seen that the use of the fence of this invention resulted in substantially less turbulence inside the enclosure 11 than did the use of the fully apertured conventional fence.

I claim:

1. A system for lowering the level of turbulance in an opening through a wall over which air is flowing at a subsonic velocity; said opening having a predetermined length, L; comprising a fence secured to the aircraft wall at a location adjacent and parallel to a leading edge of said opening; said fence having only distal portion thereof a plurality, said apertures making up to 50 percent of the area of said distal portion 2. The system of claim 1 wherein the apertured distal portion of the fence makes up 35 to 65 percent of the total area of the fence.

3. The system of claim 2 wherein the apertures make up about 40 percent of said distal portion.

* * * * *